Oct. 30, 1928.
H. C. SCHAPER
WEIGHT INDICATING SCALE
Filed Oct. 13, 1921    4 Sheets-Sheet 1
1,689,753
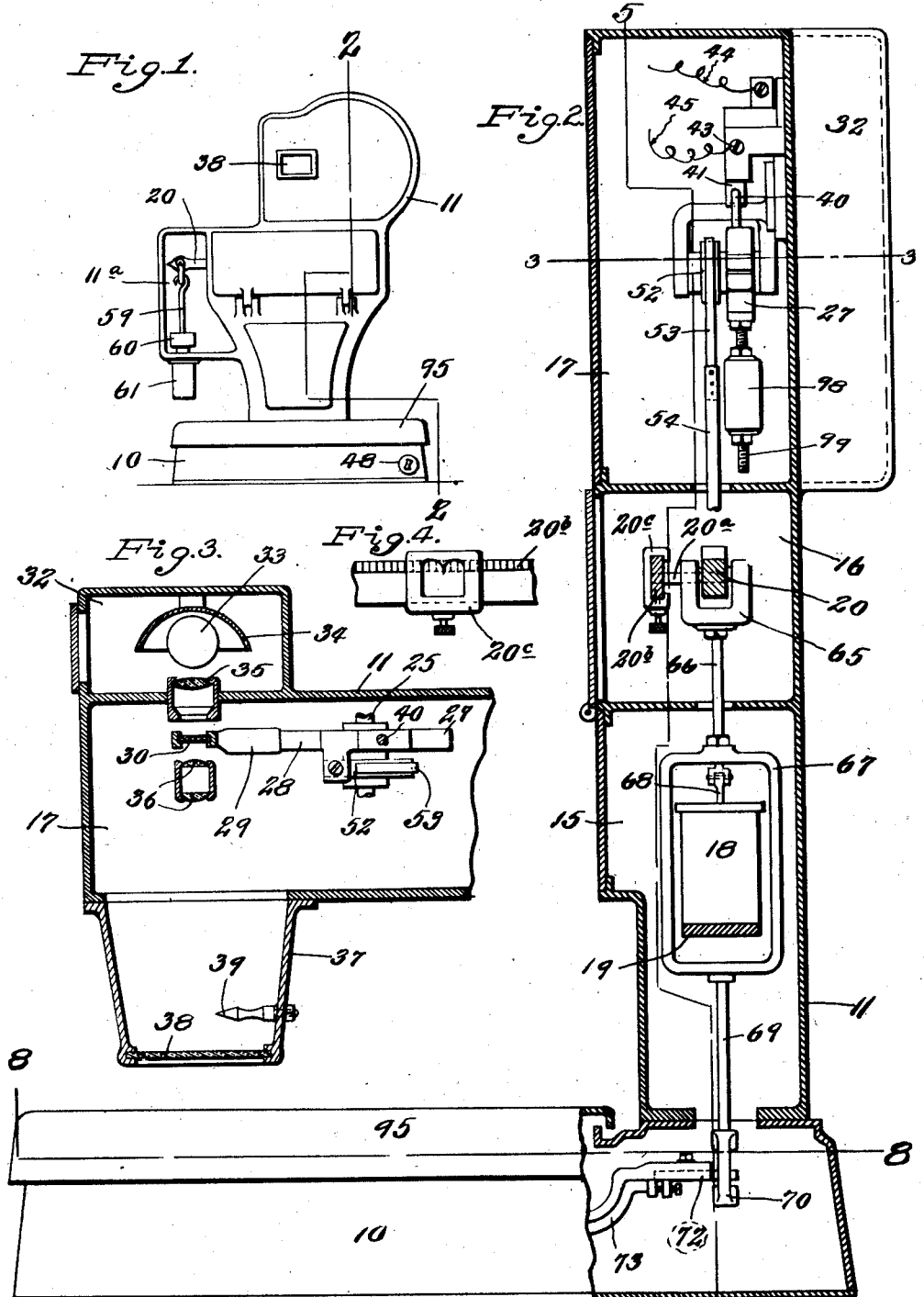
Inventor.
Harry C. Schaper.
By F. K. Cornwall Atty.

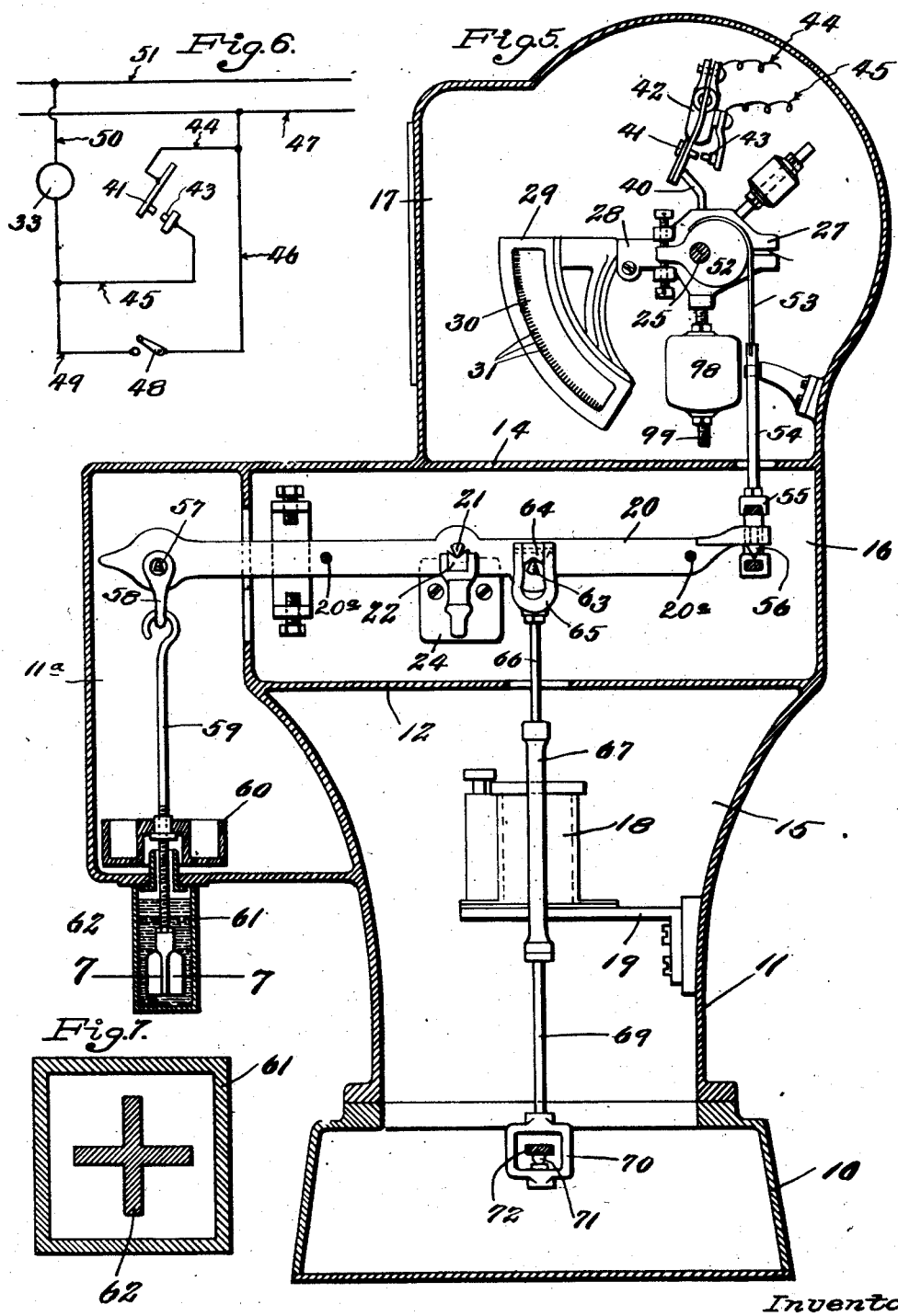

Oct. 30, 1928.

H. C. SCHAPER 1,689,753

WEIGHT INDICATING SCALE

Filed Oct. 13, 1921

Inventor.
Harry C. Schaper.
By F. R. Cornwall Atty.

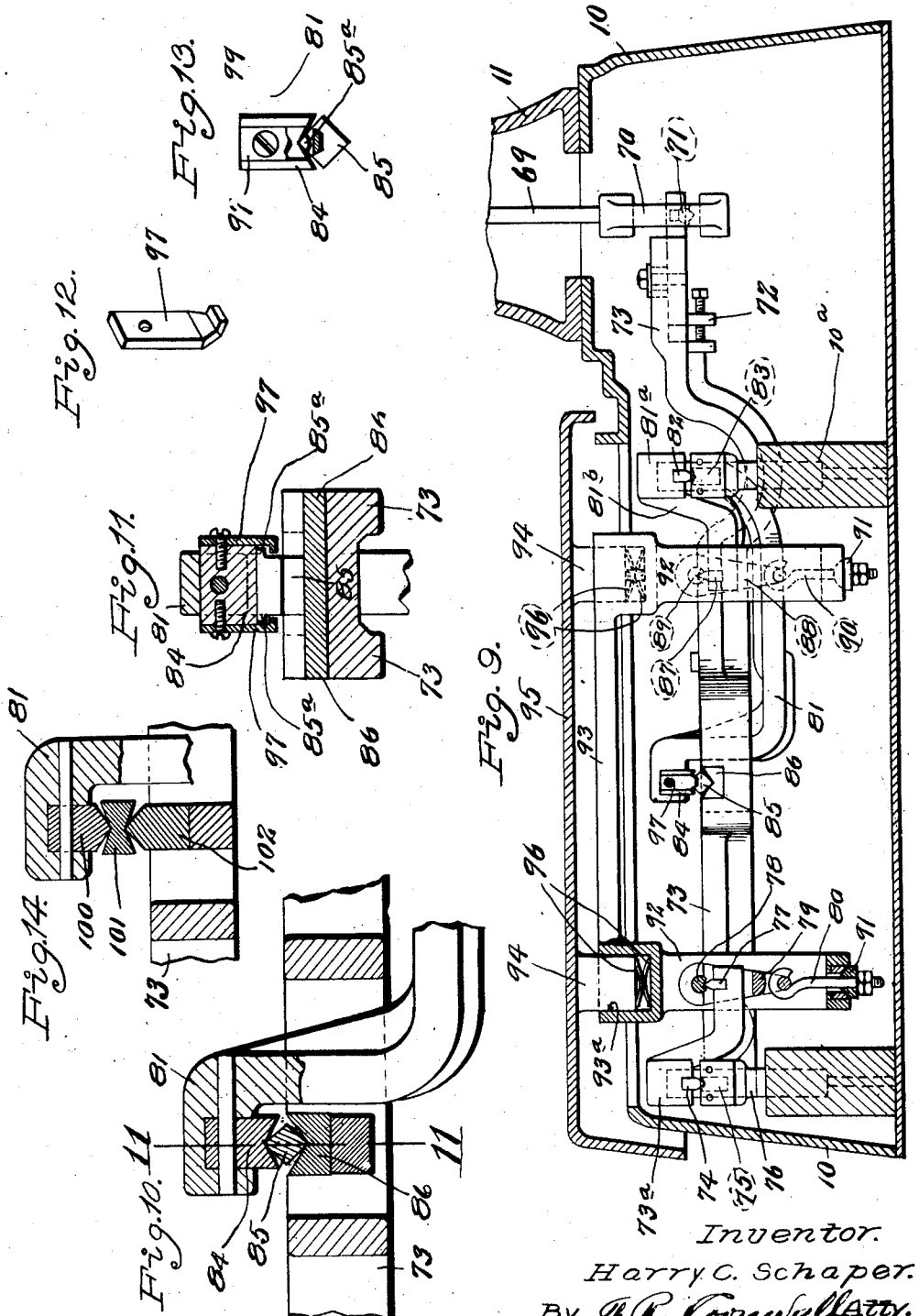

Patented Oct. 30, 1928.

1,689,753

UNITED STATES PATENT OFFICE.

HARRY C. SCHAPER, OF ST. LOUIS, MISSOURI, ASSIGNOR TO THE WEIGHT-O-GRAPH COMPANY, OF ST. LOUIS, MISSOURI, A CORPORATION OF MISSOURI.

WEIGHT-INDICATING SCALE.

Application filed October 13, 1921. Serial No. 507,492.

This invention relates generally to weighing scales, and more particularly to weighing scales in which the beam lever operates a member having weight indicia whereby the latter are projected in an enlarged form onto a screen.

The object of this invention is to provide a scale of the class described in which the source of light used in combination with the projecting means is controlled by the movement of the weight indicia member, and which source of light may be manually controlled independently of the actuation of said weight indicia member.

Another object of my invention is to provide a double knife-edge pivot member for the load actuated levers and suitable means for retaining said pivot member in operative relation with one of said levers.

Another object of my invention is to provide stabilizing means for the beam lever whereby the vibration of the latter is reduced to minimum.

With the foregoing and other objects in view, my invention consists in certain novel features of construction and arrangement of parts hereinafter more fully described and claimed, and illustrated in the accompanying drawings, in which,—

Fig. 1 is a front elevation of the weight indicating scale.

Fig. 2 is a vertical cross section taken on line 2—2 of Fig. 1.

Fig. 3 is a horizontal cross section taken on line 3—3 of Fig. 2.

Fig. 4 is a fragmental view of the scale beam.

Fig. 5 is a vertical cross section taken on line 5—5 of Fig. 2.

Fig. 6 is a diagrammatic view showing the electrical connections for the source of light and the contacts controlling the same.

Fig. 7 is a horizontal cross section taken on line 7—7 of Fig. 5.

Fig. 9 is a vertical cross section taken on line 9—9 of Fig. 8.

Fig. 10 is a vertical cross section taken on line 10—10 of Fig. 8.

Fig. 11 is a vertical cross section taken on line 11—11 of Fig. 10.

Fig. 12 is a perspective detail view of one of the retaining plates.

Fig. 13 is a detail view showing the retaining plate in position on one of the levers.

Fig. 14 is a detail vertical cross section showing a modified form of the double knife edge bearing for the operating levers.

Figure 8:
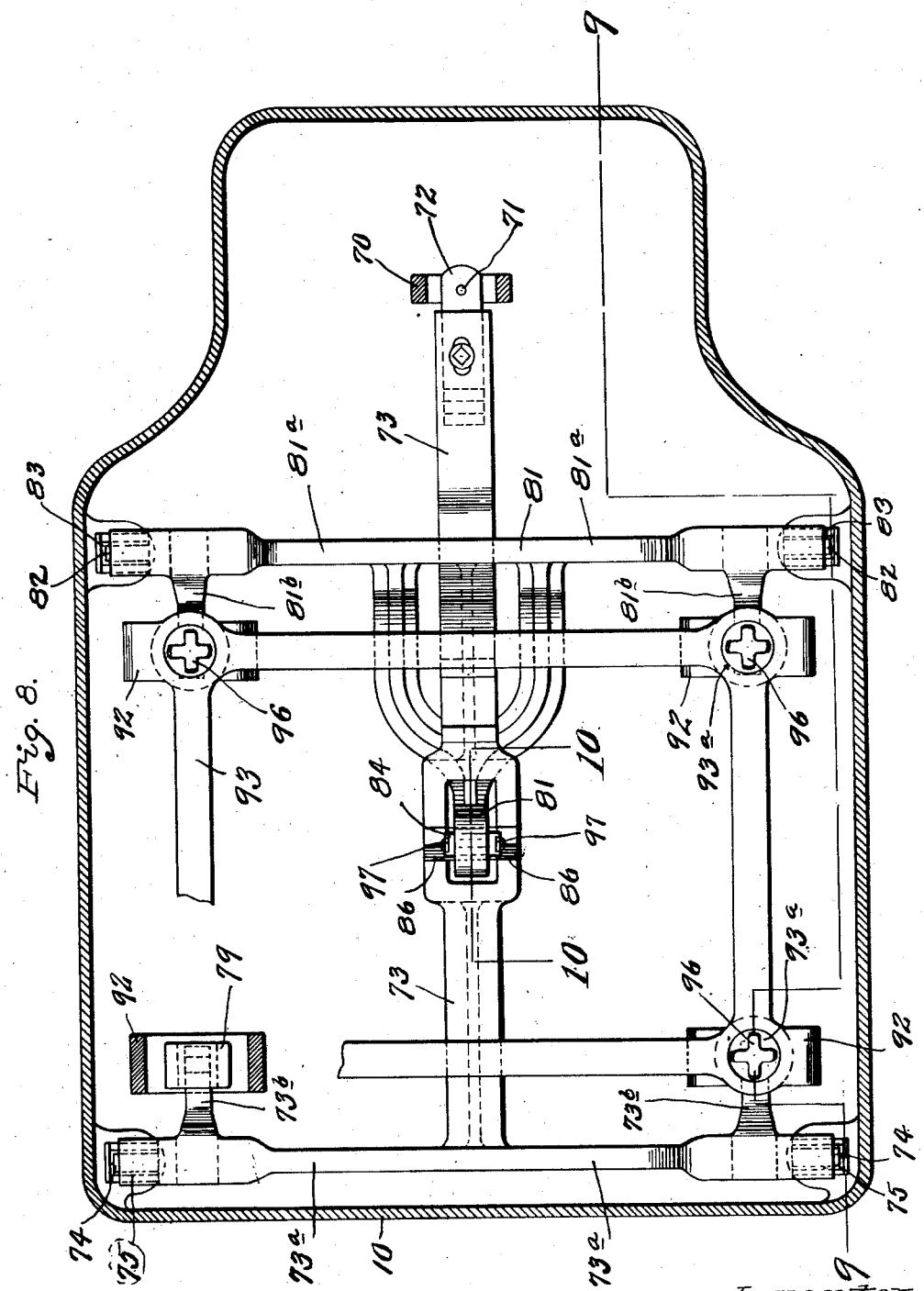
Fig. 8 is a horizontal cross section taken on line 8—8 of Fig. 2.

In the accompanying drawings, 10 indicates a base which is of boxlike construction. Projecting upwardly from the rear end of the base is a housing 11 which is divided by horizontally disposed walls 12 and 14 into three compartments 15, 16, and 17. A dash pot 18 is located in the lowermost compartment 15 and supported in a central position therein by a bracket 19 fixed to and projecting from one of the walls of housing 11.

The intermediate compartment 16 has mounted therein a beam lever 20 which has a knife-edge pivot 21 resting in V-shaped grooves formed in the upper faces of bearing blocks 22. These blocks are carried by a bracket 24 secured to the rear wall of housing 11. The upper compartment 17 contains a shaft 25 transversely disposed therein and journaled in suitable bearings in a bracket 26 which extends forwardly from the rear wall of housing 11. Supported on the shaft 25 is a casting 27 having a tubular extension 28 which is adapted to receive and hold in position a frame 29 having an arcuate opening in which is located a transparent member 30 provided with a series of graduations or weight indicia 31 arranged concentrically thereon with the shaft 25.

Formed on the housing 11 rearwardly of the compartment 17 is a chamber 32 in which is located a source of light, such as an electric lamp 33 having a reflector 34. This lamp 33 is in alinement with a lens 35, positioned in the rear wall of the housing 11, and the zero mark or graduation of the member 30 when the latter occupies normal or zero position. A pair of associated projecting lenses 36 are supported in front of the member 30 and in alinement with the lens 35 and the lamp 33. The housing 11 is provided with an opening in its front wall in front of the projecting lenses 36, and fixed to this wall is a hood or extension 37, the front wall of which is of translucent material to form a screen 38. Projecting laterally from one of said side walls of the extension 37 is a pointer 39 the shadow of which is cast on said screen when the source of light 33 is energized and serves as a guide in locating the proper weight indicia projected onto said screen by lenses 35 and 36.

Projecting upwardly from the casting 27 is a pin 40 which is adapted to engage and displace a movable electric contact 41 yieldingly supported on a bracket 42 from its co-operating stationary contact member 43 also supported by said bracket 42 and insulated therefrom.

The contact member 41 is connected by a wire connection 44 to a wire 46 which latter leads from one of the supply wires 47 to a manually operable switch 48 secured to the base 10. A wire 45 connects the stationary contact 43 to a wire 49 leading from the other terminal of the switch 48 to one of the terminals of the electric lamp 33. The other terminal of the lamp 33 is connected by a wire 50 to a supply wire 51. Thus, the contacts 41 and 43 are connected with the circuit of the lamp 33 in parallel with the switch 48 so that, either by closing the contacts 41 and 43 or by manipulating the switch 48, electric current will pass from the wire 47 through the corresponding wire connections to the lamp 33 and thence through the wire 50 to the other supply wire 51.

An eccentric disc 52 is carried on the shaft 25 adjacent to the casting 27 and is in adjustable operative relation with the latter, whereby the actuation of said disc will operate the casting 27 and oscillate or move upwardly the weight indicia member 30.

Depending from the eccentric disc 52 and having its upper end secured thereto, is a tape 53 the lower end of which is secured to a rod 54 extending upwardly from the compartment 16 through a suitable opening in the wall 14 into the compartment 17. The lower end of a rod 54 has fixed thereto a stirrup 55 having a bearing block which is adapted to be engaged by the downwardly presented cone-shaped bearing member 56, which bearing member is carried by the rear end of the beam lever 20. The opposite end of said beam lever is provided with knife-edge bearings 57, supported on which is a loop 58. Engaging this loop is the upper hooked end of a rod 59, which rod has adjustably mounted thereon a hollow counterpoise 60 on which counterweights may be placed.

The lower end of the rod 59 passes outwardly through the bottom wall of the extension 11ª and enters a tank 61 which is fixed to and depends from the bottom wall of said extension. This tank is filled with liquid, and operating therein is a stabilizing member 62 which is cruciform in cross-section and is adjustably carried by the lower end of the rod 59 (Figs. 5 and 7). The liquid contained in the tank 61 offers resistance to the lateral movement of the vertically disposed faces of the member 62, thereby materially reducing the vibration of the beam lever 20.

An upwardly presented knife-edge pivot member 63 is secured to the beam lever 20 to one side of pivot member 21, and supported on the knife edge of this member 63 are bearing blocks 64 carried by a downwardly extending loop 65. Depending from the loop 65 is a rod 66 which passes downwardly through an opening 12 into the compartment 15 and has its lower end seated in the upper end of a loop 67 extending below and straddling the dash-pot 18. Extending downwardly from the upper end of the loop 67 is a rod 68 which enters dash-pot 18 and is provided on its lower end with a piston which operates in the liquid in said dash-pot in the usual manner.

Connected to the lower end of the loop 67 and entering the boxlike base 10 is a rod 69 provided on its lower end with a stirrup 70. Operating in a bearing in the lower end of the stirrup 70 is the pointed end of a downwardly extending bearing pin 71 fixed to one end of a bracket 72 adjustably carried by the rear end of a lever 73. This lever extends forwardly in the base 10 and its forward end is provided with transverse portions 73ª having downwardly extending knife-edge pivot members 74 which operate in V-shaped grooves formed in the bearing blocks 75 carried by bearings 76 adjustably disposed in the tubular members 10ª formed integral with and projecting inwardly from the base member 10.

Projecting inwardly from the portions 73ª are arms 73ᵇ in which are disposed upwardly extending knife-edge pivot members 77. Supported on each pivot member 77 by means of a bearing block 78 is a loop 79 from the lower end of which is suspended a rod 80. Oppositely disposed to the lever 73 is a comparatively short lever 81, having transverse portions 81ª carrying knife-edge members 82 resting in V-shaped grooves in the bearing blocks 83 supported in the base 10 in the same manner as the bearing blocks 75. The forward end of the lever 81 projects upwardly through a slot formed in the lever 73 and carries a bearing block 84 having a downwardly extending V-shaped groove adapted to be engaged by the upper edge of a double knife-edge fulcrum member 85, the lower edge of which has a bearing in the bearing blocks 86 fixed in the lever 73.

Projecting inwardly from the transverse portions 81ª are arms 81ᵇ carrying upwardly extending knife-edge members 87. A loop 88, having a bearing block 89 which engages the pivot member 87, depends from each arm 81ᵇ and its lower end is engaged by the hooked ends of a rod 90, which rods are similar in shape and size to the rods 80.

The lower ends of the rods 80 and 90 are threaded and adjustably support semispherical bearing members 91 which engage the undersides of stirrups 92 formed integral with and depending from a spider frame 93. This frame operates through an opening formed in the top of the base 10 and is provided with vertically disposed cylindrical recesses 93ª in which are slidingly disposed cylindrical bosses or lugs 94 extending downwardly from the underside of the platform 95. Positioned in each recess 93ª is a pair of curved leaf springs 96 which are placed with their convex sides toward each other so that the ends of the upper member engage the bosses 94 and the ends of the lower member rest on the bottom of the recess 93ª. Thus, the springs 96 form a yielding support for the platform 95 and will absorb any jars or shocks to which the platform might be subjected, thereby preventing injury to the knife-edge members 79 and 87.

In order to prevent displacement or loss of the fulcrum member 85 during the assembling of the scale, plates 97 are fixed to bearing block 84 so that their inwardly turned ends rest under the portions 85ª which project longitudinally from the fulcrum member 85. When the levers 73 and 81 are in assembled position, the transverse portions of the plates 97 are disposed below the projections 85ª a sufficient distance to leave clearance therebetween and not interfere with the operation of the fulcrum member 85. The bearing edges of the pivot members 74, 77, 82 and 87 occupy the same horizontal plane, and the bearing edges of the fulcrum member 85 are preferably disposed equidistant from this plane.

Laterally projecting from the lever 20 are pins 20ª which carry a scale beam 20ᵇ having graduations arranged thereon for co-operation with a pointer 20ᶜ slidably positioned thereon.

In the operation of my weighing scale, assuming a load is placed on the platform 95, the levers 73 and 81 are operated on their pivots 74 and 82, causing the rear end of the lever 73 on which the bearing pin 71 is supported to move downwardly. This produces a downward pull on the rods 69 and 66 and rocks the beam lever 20 on its pivot 21. The lever 20 will cause rod 54 to move downwardly, thereby actuating the casting 27 by means of the flexible connection 63, one end of which is secured to the concentric 52. The actuation of the casting 27 will cause the member 30 to move upwardly in an arc concentric with the shaft 25 and thus position the proper weight indicating mark 31 in alinement with the lenses 35 and 36 and the lamp 33. The electric circuit of the lamp is closed immediately upon the actuation of the casting 27 by virtue of the fact that the pin 40, which held the contact 41 away from the contact 43, has been displaced, thereby allowing the movable contact 41 to engage the stationary contact 43. As soon as the load is removed from the platform 95, the levers 73 and 81 and the beam lever 20 will resume their normal positions, causing the casting 27 and the weight indicia member 30 to return to their normal positions under the influence of the weight 98 which is adjustably mounted on the rod 99 depending from the casting 27. The return movement of the casting 27 will cause the pin 40 to engage the yielding contact 41 and move it out of contact with the contact member 43 so that the circuit of the lamp 33 is broken.

Since the contacts 41 and 43 are disconnected when the weight indicia member 30 occupies its zero position, it would be impossible to ascertain if the zero mark when projected on the screen 38 is in alinement with the pointer 39 and, in order to enable the weighman to do so, the switch 48 is provided, the closing of which switch will close the circuit of the lamp 33 independently of the automatic contacts 41 and 43.

In Fig. 14, a modified form of pivotal connection between the levers 73 and 81 is shown in which a downwardly presented knife-edge pivot member 100 is carried by the upper end of the lever 81, and has a bearing in the upwardly presented V-shaped groove of the bearing block 101. The lever 73 is provided with a pivot 102 having its knife-edge presented upwardly and engaging a V-shaped groove formed in the underside of the bearing block 101 in alinement with the pivot member 100. The provision of the double-edged pivot connection between the levers 73 and 81 insures accurate and efficient co-operation of said levers and, by making said pivot member removable, it can be easily and quickly removed when worn out.

What I claim is:

1. In a weight indicating scale, a weight receiving member, a pair of co-operating levers, a frame supported in a suspended position by said levers and supporting said weight receiving member, a beam lever, operative connections between said co-operating levers and said beam lever, an oscillating transparent member provided with weight indicia, operative connections between said beam lever and said weight indicia member, a screen, means for projecting said weight indicia in enlarged form upon said screen, said projecting means including a source of light, an electric circuit for said source of light, a manually operable switch for controlling said circuit, and auxiliary contacts interposed in said circuit in parallel with said switch and operable by means of said oscillating member.

2. In a weight indicating scale, the combination with a scale beam, of a housing, an arm pivotally supported therein, a weight indicia member carried by the free end of said arm, a screen, a source of light, means co-operating with said source of light for projecting said weight indicia onto said screen, operative connections between said scale beam and said arm, an electric circuit for said source of light, contacts in said circuit operable by said arm, and a manually operable switch for closing and opening said circuit independently of said contacts.

3. In a weighing scale, the combination with a beam lever, of a housing, an arm pivotally mounted therein, a weight indicia member carried by said arm, operative connections between said lever and said arm whereby said weight indicia member moves in accordance with the weight placed on the scale, a screen, means for projecting said weight indicia onto said screen, and a vertically movable stabilizing member connected to said beam lever and having vertically disposed walls operating in a suitable liquid.

4. In a weighing scale, the combination with a beam lever, of a housing, an arm pivotally mounted therein, a weight indicia member carried by said arm, operative connections between said beam lever and said arm whereby said weight indicia member moves in accordance with the weight placed on the scale, a screen, means for projecting said weight indicia onto said screen, and a stabilizing member suspended from said beam lever, said member being cruciform in cross-section and operating in a suitable liquid whereby said beam lever is held against vibration.

5. In a weight indicating scale, a pair of oppositely disposed levers each having a knife-edge pivot at one of its ends, a double knife-edge pivot member operatively disposed between one end of one of said levers and the body portion of the other of said levers at a point equidistant from the pivots of said levers, a weight receiving member supported on said levers, a housing, a beam lever having a knife-edge bearing in said housing, operative connection between said beam lever and one of said co-operating levers, an arm pivotally mounted in said housing, a weight indicia member carried by said arm, operative connections between one end of said beam lever and said arm, a screen, and means for projecting said weight indicia in enlarged form onto said screen.

6. In a weight indicating scale, a pair of oppositely disposed levers having a double knife-edge co-operating fulcrum, one of said levers projecting rearwardly beyond the opposite lever, a housing, a beam lever having a knife-edge fulcrum therein above said co-operating levers, a rod having at one end a knife-edge pivot connection with said beam lever and at its other end an operative connection with the rearwardly projecting end of said lever, a shaft journaled in said housing, an arm carried by said shaft, a weight indicia member fixed to the free end of said arm, an eccentric disk adjustably carried by said arm, a flexible connection fixed at one end to said eccentric disk, a rod connected at one end to said flexible connection, and at its other end to said beam lever, a screen carried on said housing, and means for projecting said weight indicia in enlarged form onto said screen.

7. In a weight indicating scale, the combination with a pair of co-operating levers and a load receiving member supported thereby, of a housing, a beam lever having a knife-edge fulcrum in said housing, a rod connected at one end to one of said co-operating levers, and at its opposite end to said beam lever, an arm pivotally mounted in said housing, a weight indicia member carried by one end of said arm, operative connections adjustably secured to said arm and having a point bearing with one end of said beam lever, a source of light, means for projecting said weight indicia in an enlarged form onto said screen, an electric circuit for said source of light, manipulative means for controlling said circuit, and auxiliary means for controlling said circuit and operable automatically when said scale is actuated.

8. In a weight indicating scale, a pair of co-operating levers and a load receiving platform supported thereon, a housing, a beam lever having a knife-edge fulcrum in said housing, operative connections between said beam lever and one of said co-operating levers, an arm pivotally mounted in said housing, a transparent weight indicia member carried by one end of said arm, connections adjustably secured to said arm and operatively connected to one end of said beam lever whereby said weight indicia member is actuated in accordance with the load placed on said load receiving platform, a source of light, means for projecting said weight indicia onto said screen, an electric circuit for said source of light, manipulative means for opening and closing said circuit, an auxiliary circuit for said source of light, and means operable by the actuation of said scale for opening and closing said auxiliary circuit.

9. In a scale, the combination of a scale beam, an arm, a weight indicia member carried by said arm, a screen, projecting means, a light element for said projecting means, an electric circuit for said light element, contacts in said circuit operable by said arm, and a manually operable switch for controlling said circuit independent of said contacts.

In testimony whereof I hereunto affix my signature this 8th day of October, 1921.

HARRY C. SCHAPER.